(12) United States Patent
Castle (10) Patent No.: US 12,277,374 B2
(45) Date of Patent: Apr. 15, 2025

(54) SYNTHESIS PLACEMENT BOUNDS BASED ON PHYSICAL TIMING ANALYSIS

(71) Applicant: Synopsys, Inc., Sunnyvale, CA (US)

(72) Inventor: David Castle, Irvine, CA (US)

(73) Assignee: Synopsys, Inc., Sunnyvale, CA (US)

( * ) Notice: Subject to any disclaimer, the term of this patent is extended or adjusted under 35 U.S.C. 154(b) by 490 days.

(21) Appl. No.: 17/408,261

(22) Filed: Aug. 20, 2021

(65) Prior Publication Data
US 2022/0058328 A1 Feb. 24, 2022

Related U.S. Application Data

(60) Provisional application No. 63/068,615, filed on Aug. 21, 2020.

(51) Int. Cl.
*G06F 30/392* (2020.01)
*G06N 20/00* (2019.01)
*G06F 111/04* (2020.01)

(52) U.S. Cl.
CPC ........... *G06F 30/392* (2020.01); *G06N 20/00* (2019.01); *G06F 2111/04* (2020.01)

(58) Field of Classification Search
USPC ......................................... 716/113, 118, 119
See application file for complete search history.

(56) References Cited

U.S. PATENT DOCUMENTS

| 10,867,091 | B1* | 12/2020 | Oh ........................ G06F 30/331 |
| 2001/0003843 | A1* | 6/2001 | Scepanovic ........... G06F 30/392 |
| | | | 716/118 |
| 2008/0077900 | A1* | 3/2008 | Oh .......................... G06F 30/33 |
| | | | 716/122 |
| 2016/0070844 | A1* | 3/2016 | Shyamsukha ......... G06F 30/398 |
| | | | 716/113 |
| 2018/0293492 | A1* | 10/2018 | Kalamkar .............. G06N 3/044 |

FOREIGN PATENT DOCUMENTS

CN 111079361 * 4/2020

* cited by examiner

*Primary Examiner* — Brian Ngo
(74) *Attorney, Agent, or Firm* — Weaver Austin Villeneuve & Sampson LLP (57) ABSTRACT

Embodiments provide for improved placement bounds. An example method includes identifying, based on a first synthesizing of an integrated circuit layout representation, a plurality of integrated circuit endpoints. The example method further includes identifying, based on a plurality of feature vectors each representing an endpoint of the plurality of integrated circuit endpoints, a plurality of integrated circuit clusters. Each integrated circuit cluster comprises a unique subset of integrated circuit endpoints of the plurality of integrated circuit endpoints. The example method further includes applying, using a processor and based on a subsequent synthesizing of the integrated circuit layout representation, placement bounds to the integrated circuit layout representation. The placement bounds are applied based on the plurality of integrated circuit clusters.

19 Claims, 8 Drawing Sheets

SYNTHESIS PLACEMENT BOUNDS BASED ON PHYSICAL TIMING ANALYSIS

CROSS-REFERENCE TO RELATED APPLICATIONS

The present application claims priority to United States Provisional Application Ser. No. 63/068,615, titled "OPTIMIZING SYNTHESIS PLACEMENT BOUNDS BASED ON PHYSICAL TIMING ANALYSIS," filed Aug. 21, 2020, the contents of which are incorporated herein by reference in their entirety.

TECHNICAL FIELD

The present disclosure relates generally to an electronic design automation system, and more particularly, to improved synthesis placement bounds based on physical timing analysis.

BACKGROUND

In integrated circuit (IC) design, partitioning of a given design occurs when a design is partitioned into sub-blocks and then each sub-block or group of sub-blocks is designed. The design sub-blocks are then linked together. One goal in partitioning is to split the circuit such that the number of connections between partitions is minimized. Partitioning is helpful in reducing design complexity and improving synthesis run times since partitioning results in smaller sub-blocks of the design synthesizing faster than synthesizing the entire design at once.

SUMMARY

Embodiments provide for optimizing placement bounds. An example method includes identifying, based on a first synthesizing of an integrated circuit layout representation, a plurality of integrated circuit endpoints. The example method further includes identifying, based on a plurality of feature vectors each representing an endpoint of the plurality of integrated circuit endpoints, a plurality of integrated circuit clusters. In embodiments, each integrated circuit cluster comprises a unique subset of integrated circuit endpoints of the plurality of integrated circuit endpoints. The example method further includes applying, using a processor and based on a subsequent synthesizing of the integrated circuit layout representation, placement bounds to the integrated circuit layout representation. In embodiments, the placement bounds are applied based on the plurality of integrated circuit clusters.

In various embodiments, identifying the plurality of integrated circuit clusters comprises applying unsupervised machine learning to the plurality of feature vectors. In various embodiments, the unsupervised machine learning comprises density-based clustering. In various embodiments, the density-based clustering comprises identifying subsets of integrated circuit endpoints of the plurality of integrated circuit endpoints based on affinities associated with data records of feature vectors associated with the integrated circuit endpoints.

In various embodiments, a feature vector comprises a plurality of data records. Each data record comprises a data value representative of one or more of group designation, hierarchical endpoint name, required path time, slack, endpoint location launch clock, start point hierarchical name, or start point physical location.

In various embodiments, the example method further includes identifying an integrated circuit cluster subset comprising those integrated circuit clusters of the plurality of integrated circuit clusters that meet one or more constraints, and applying the placement bounds to the integrated circuit cluster subset. In various embodiments, the one or more constraints comprise timing constraints.

In various embodiments, a placement bound defines constraints associated with placement of one or more cells within an integrated circuit design represented by the integrated circuit layout representation. In various embodiments, a placement bound comprises one or more of a command, a bound name, a boundary region, an effort definition, or a list of cells within an integrated circuit cluster of the plurality of integrated circuit clusters.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to improving synthesis placement bounds based on physical timing analysis.

In embodiments herein, unsupervised machine learning is applied to leverage positive results from passing an initial integrated circuit (IC) design layout through an register-transfer level (RTL) synthesis to physical placement tool such that better physical placement information is available for a subsequent pass of the IC design layout through the tool.

There are many ways to physically partition a digital integrated circuit (IC) design for effective engineering of an application-specific integrated circuit (ASIC). Conventional methods require very experienced physical design experts to work interactively with very experienced digital designers to arrange the logical blocks of the IC design in a physical way that meets timing and is routable. This requires many iterations to derive a layout that balances many tradeoffs. There is no way to know if the optimum layout has been generated because there are too many arrangement options to be exhaustively analyzed, so engineers must rely on intuition and experience to guide the process of narrowing the searching of as many experimental trials as are feasible within the allotted time. This task is difficult and time-consuming and, consequently, it is almost never repeated during a project unless something changes significantly enough to require starting over from scratch. Usually, a layout that works is maintained for an entire project even when it potentially could be improved.

Embodiments herein solve the aforementioned drawbacks and more by employing machine learning to identify groups of endpoints of an integrated circuit (IC) design that meet timing constraints or requirements. Equipped with the knowledge of these groups of endpoints, an RTL synthesis to physical placement tool can optimize or improve subsequent synthesis of the IC design and make better physical placement choices. Unsupervised machine learning enables identification of the groups of endpoints by way of gathering all identified endpoints and clustering, according to features associated with each endpoint, endpoints according to similarities among their features.

Advantages of the present disclosure include, but are not limited to, performance improvements provided by way of optimized synthesis due to knowledge of placement bounds during a second pass of an IC design through a synthesis placement tool. That is, identification of groups or clusters of paths or endpoints that have certain affinities provides a short cut for a synthesis placement tool such that consideration of those identified clusters or groups of paths or endpoints can be eliminated in a second synthesizing of an integrated circuit. Eliminating this consideration enables faster synthesis and placement, leading to improved utilization of computing resources as well as an optimized partitioning of the IC design.

Figure 1:
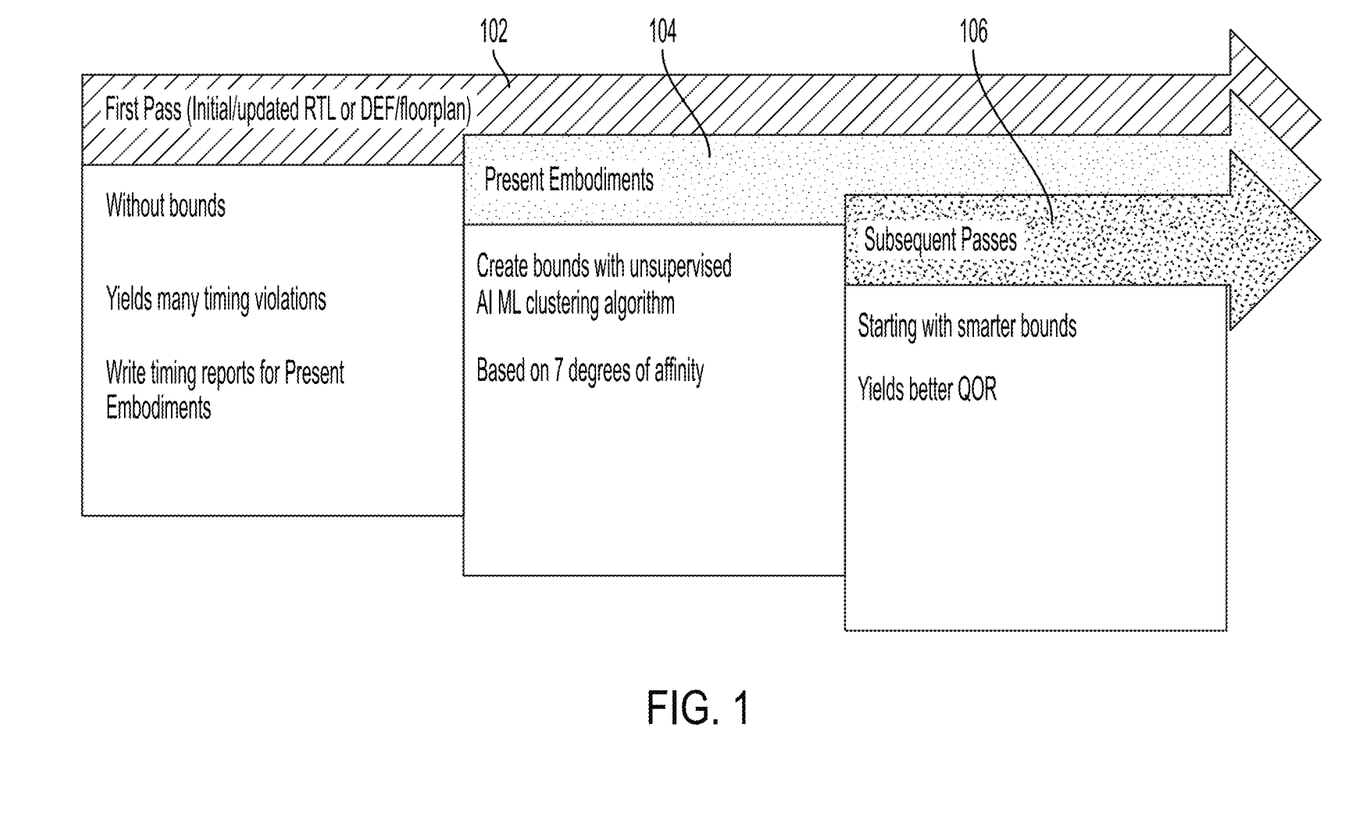
FIG. 1 illustrates a flowchart of various processes for use with embodiments of the present disclosure.

FIG. 1 illustrates a flowchart of various processes for use with embodiments of the present disclosure. Embodiments of the present disclosure employ unsupervised machine learning in order to analyze data associated with millions of circuit endpoints of an integrated circuit (IC) design (e.g., identified during a first pass 102 through an RTL synthesis to physical placement tool) to identify groups or clusters of endpoints (e.g., creating bounds with unsupervised clustering 104) that meet timing constraints or requirements. The identified groups or clusters are then fed back (e.g., subsequent passes 106) into the initial synthesis process in a way that guides the tool to make better synthesis optimization and better physical placement choices. This is dramatically more efficient than the slow iterative manual process, and is faster and more accurate than a team of engineers. While in certain embodiments a two-pass application of the RTL synthesis to physical placement tool occurs, the present embodiments drastically offset any drawback associated with two-passes through the tool based on time and efficiency savings (e.g., design time, optimization time, resource savings, IC savings based on placement and/or routing optimization).

A placement bound is a constraint that may control the placement of groups of leaf cells and hierarchical cells within an integrated circuit design. A placement bound enables a synthesis tool group cells and minimize wire length, thereby enabling placement of cells at the most appropriate, desirable, or efficient location in an integrated circuit design.

The term "machine learning model" or "machine learning algorithm" refers to a machine learning task. Machine learning is a method used to devise complex models and algorithms that lend themselves to prediction. A machine learning model is a computer-implemented algorithm that can learn from data without relying on rules-based programming. These models enable reliable, repeatable decisions and results and uncovering of hidden insights through machine-based learning from historical relationships and trends in the data. A machine learning model may initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset.

Cluster analysis or clustering is the task of grouping a set of objects in such a way that objects in the same group (called a cluster) are more similar (in some sense) to each other than to those in other groups (clusters). Cluster analysis itself may not be associated with one specific algorithm, but the general task to be solved. It can be achieved by various algorithms that differ significantly in their understanding of what constitutes a cluster and how to efficiently find them. Clustering can therefore be formulated as a multi-objective optimization problem. The appropriate clustering algorithm and parameter settings (including parameters such as the distance function to use, a density threshold or the number of expected clusters) depend on the individual data set and intended use of the results. Clustered or non-clustered attributes may be used to train a machine learning model. It should be understood that the selection of attributes or clusters of attributes for training machine learning models can affect the model performance. In some implementations, attributes and/or clusters of attributes are selected based on statistical analysis. In some implementations, selection of the most significant attributes is based on one or more different attribute selection approaches.

Density-based clustering refers to unsupervised learning methods that identify distinctive groups/clusters in the data, based on the idea that a cluster in data space is a contiguous region of high point density, separated from other such clusters by contiguous regions of low point density. Density-based spatial clustering of applications with noise (DB-SCAN) is a base algorithm for density-based clustering. It can discover clusters of different shapes and sizes from a large amount of data, which is containing noise and outliers.

The term "feature vector" refers to an n-dimensional vector of features or attributes that represent an object. N is a number. Many algorithms in machine learning require a numerical representation of objects, and therefore the features of the feature vector may be numerical representations. The term "vector" refers to a data structure having a plurality of cells, where each cell represents a value.

The term "data record" refers to an electronic data value within a data structure. A data record may, in some embodiments, be an aggregate data structure (e.g., a tuple or struct).

In embodiments, a data record is a value that contains other values. In embodiments, the elements of a data record may be referred to as fields or members.

Embodiments of the present disclosure relate to input data gathering, data preparation, unsupervised machine learning clustering, and output command generation for use in conjunction with register-transfer level (RTL) synthesis to physical placement tools.

In certain embodiments, input data gathering can be performed according to a variety of methodologies. Ultimately, the goal of input data gathering is to gather data for the unsupervised machine learning clustering. For example, this data can be gathered by running a script within a physical layout tool (e.g., such as ICC2 or Fusion Compiler). It will be appreciated that any manner in which input data is gathered for use with certain embodiments herein are within the scope of the present disclosure.

As an example, input data that can be gathered regarding a given integrated circuit (IC) layout having been passed through a synthesis to physical placement tool may include a group designation. A group designation may be assigned by the synthesis tool based on endpoint clock or the use of a variety of techniques for assigning logic to a path group.

By way of further example, input data that can be gathered regarding a given integrated circuit (IC) layout having been passed through a synthesis to physical placement tool may include an hierarchical endpoint name. An hierarchical endpoint name may include the full pathname of the hierarchical endpoint including module information (e.g., central processing unit, input output processing unit, numerical processing unit, state machine logic, and the like). The hierarchical endpoint name may further include register names that are indicative of functional usage (e.g., state information, status description, operational result, error indication, and the like). Additionally, the hierarchical endpoint name may include pin names that are indicative of specific operation (such as clock, reset, enable, and the like).

By way of further example, input data that can be gathered regarding a given integrated circuit (IC) layout having been passed through a synthesis to physical placement tool may include a required path time. Each circuit within an ASIC may have internal and external delays, internal and external clock cycle times, and foundry-specific library timing arcs for each standard cell. These are used to calculate the required time for each path in a design.

By way of further example, input data that can be gathered regarding a given integrated circuit (IC) layout having been passed through a synthesis to physical placement tool may include slack. Slack refers to positive or negative differences between the calculated path delay and the required path time. Positive slack means the logic in the path operates fast enough to meet the required path time with this much slack. Negative slack means the logic in the path is too slow to meet the required path time by this much.

By way of further example, input data that can be gathered regarding a given integrated circuit (IC) layout having been passed through a synthesis to physical placement tool may include an endpoint location. An endpoint location may be the physical location of the endpoint as placed by the physical placement portion of the RTL synthesis to physical placement tool. In certain embodiments, the physical location may be defined by a two dimensional X,Y planar grid. However, it will be appreciated that embodiments of the present disclosure extend to three dimensional X,Y,Z volumetric circuitry. It will be appreciated that there is no limit to the number of dimensions that could be handled using embodiments of the present disclosure.

By way of further example, input data that can be gathered regarding a given integrated circuit (IC) layout having been passed through a synthesis to physical placement tool may include launch clock, startpoint hierarchical name, startpoint physical location, data from all the logic in the circuit path, and more. It will be appreciated that any data gathered for a given integrated circuit or tool and used according to embodiments herein is within the scope of the present disclosure.

In certain embodiments, input data gathered may be extracted into several feature vectors (e.g., data structures having multiple data records, each data record representing a unique feature or attribute). For example, a resulting input data file may include a binary data base, an ASCII file, a shared memory structure, or the like.

Examples of feature vectors for use with embodiments of the present disclosure may include:

*in2reg_default**bit_secure_4/slice_16/lreset_sync_reset_sync_reg/RSTB 10.176659 9.969626 4254.9790 1843.8490; or

*in2reg_default**bit_secure_4/slice_16/lreset_sync_t_reset_sync_reg/RSTB 10.176544 9.978019 4255.5870 1857.5260.

In certain embodiments, input data gathered is prepared according to preferences associated with an unsupervised machine learning clustering application. It will be appreciated that any method of data preparation or normalization is within the scope of the present disclosure.

For example, numeric data may be normalized to floating point numbers between 0.0 and 1.0 for each parameter that is going to be analyzed.

In certain embodiments, a linear min-max algorithm may be selected for data normalization based on a physical planar nature of the data. An example of the linear min-max normalization may be represented according to the following: value=(value−MIN)/(MAX−MIN).

In certain example embodiments, all the values in the data may be analyzed to find the minimum value and the maximum value. Each numeric value in the data may be normalized in 2 steps. An interim value of each numeric value is generated by subtracting the minimum value. This interim value is in the range between 0 and the maximum value minus the minimum value. The final normalized numeric value is generated by dividing this interim value by the difference between the maximum value and the minimum value. This results in all numeric data being in the range of 0.0 to 1.0.

In certain embodiments, ASCII string data may be converted into numeric data. While there are many possible methods for converting ASCII string data into numeric data, all within the scope of the present disclosure, a simple sum of ASCII character values may be used. That is, for each character in ASCII, the ASCII value of the character is summed to produce a final total. For example, the ASCII string "STATUS" has the following character values: S=83, T=84, A=65, T=84, U=85, S=83, where the sum of these values is 484.

These resulting numeric values may be normalized from 0.0 to 1.0 for the unsupervised machine learning clustering algorithm. In certain embodiments, a simple max normalization chosen (while all methodologies may be within the scope of the present disclosure). For example, for each value in data: value=value/MAX. That is, first, all the values in the data are analyzed to find the maximum value. Then each numeric value is divided by this maximum value. This results in all numeric data being in the range of 0.0 to 1.0.

Embodiments of the present disclosure process or transform normalized input data (e.g., gathered and prepared according to methods herein) using unsupervised machine learning clustering. While there are many methodologies that can be used for the processing (e.g., that are within the scope of the present disclosure), example embodiments use DBSCAN (density-based spatial clustering of applications with noise) because it is memory efficient with a fast runtime.

It will be appreciated that each unsupervised machine learning clustering algorithm may require data to be supplied in certain formats. In this embodiment, the data is provided as a feature vector with a list of arrays as shown below. Each row in the list consists of a particular endpoint. Each column in the endpoint array consists of the normalized numeric value of the input data. An example of a feature vector including a list of endpoint arrays may include:

vector=[array([0.89, 0.85, 0.99, 0.40, 0.0, 0.28, 1.0]),
array([0.89, 0.78, 0.35, 0.90, 0.06, 0.16, 0.13])].

The feature vector is passed to the unsupervised machine learning clustering algorithm along with optional parameters that define its operation.

The unsupervised machine learning clustering algorithm operates on this data and returns a list of labels for each data point in the vector. Each cluster is given a unique label, which identifies the cluster that it has been assigned to.

After all the data points have been labeled by the unsupervised machine learning clustering algorithm, embodiments herein enable representing the data points in a tool-specific manner for use with the given RTL synthesis tool of choice. It will be appreciated that there are many tools and many ways the output commands can be generated and passed to the tools (such as ASCII file, binary database, shared memory in the tool, and the like), all within the scope of the present disclosure.

In embodiments, placement commands are generated based on the input data gathered and the cluster labels generated herein. In certain embodiments, a placement command may include: a (1) command, (2) bound name, (3) boundary region, (4) effort definition, and/or (5) list of cells in the cluster. Each RTL synthesis tool has a different command structure for this operation—embodiments described herein enable provision of the appropriate command with the appropriate options to generate the calculated bound for each cluster of cells.

A bound name is preferably unique, and can be as simple as a numeric counter. In examples, a greatest common denominator algorithm may be employed to choose the most common ASCII string in the endpoint names of each cluster.

A boundary region may refer to the physical placement region of the cluster. Example embodiments use a simple mean +/− standard deviation algorithm. Other algorithms such as rectangular bounding box or polygonal bounding box could be used.

A list of cells may represent the endpoint name of the input data without the pin name.

It will be appreciated that, while various embodiments described herein refer to a tool performing synthesis or a tool performing place and route for an integrated circuit, embodiments herein are not limited to use with tools that only perform synthesis or only perform place and route. It will be appreciated that embodiments herein relate to identifying clusters after an initial synthesis and/or an initial place-and-route processing of an integrated circuit design or representation and then using the identified clusters for a subsequent synthesis and/or a subsequent place-and-route processing of the integrated circuit design or representation.

Figure 2A:
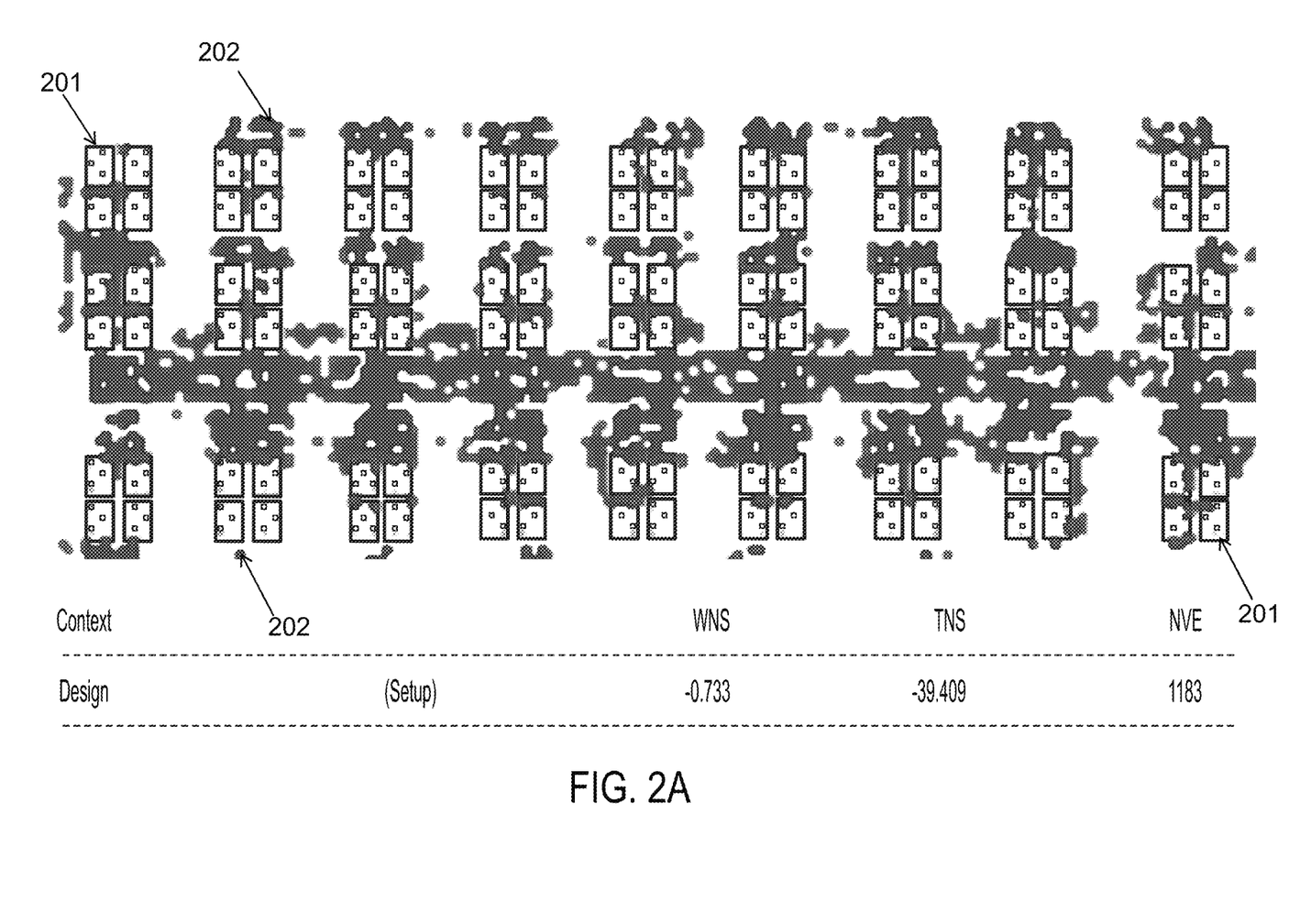
FIG. 2A illustrates an example identification of integrated circuit endpoints based on an initial synthesis of an integrated circuit layout representation, in accordance with embodiments of the present disclosure.

FIG. 2A illustrates an example identification of a plurality of integrated circuit endpoints based on running an initial synthesizing of an integrated circuit layout representation, in accordance with embodiments of the present disclosure. Shown in FIG. 2A, an example integrated circuit (IC) design (e.g., an application of a bitcoin mining engine) is synthesized with a constraint hclk of 0.5 and lclk of 0.5 (e.g., yielding an $F_{MAX}$ of 811 megahertz (MHz)). In FIG. 2A, the squares (e.g., 201) represent memory instantiations while the shaded dots (e.g., 202) represent standard cell components. FIG. 2A illustrates a uniform distribution of endpoints, where some meet timing requirements or constraints and some violate timing requirements or constraints.

Also shown in FIG. 2A, the results of having passed the design through the synthesis tool are a worst negative slack (WNS) of −0.733, a total negative slack (TNS) of −39.409, and a number of violating endpoints (NVE) of 1183.

Figure 2B:
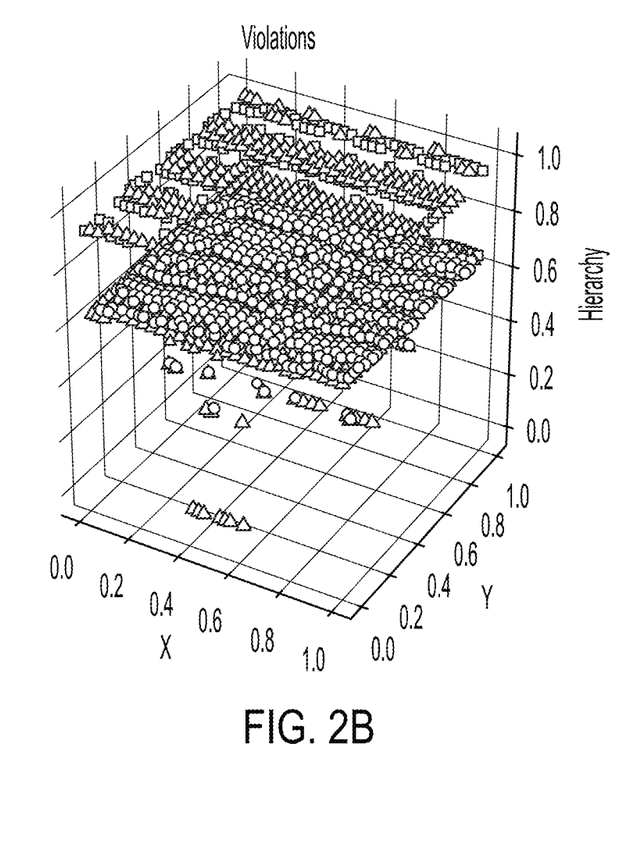
FIG. 2B illustrates an example identification of violations associated with the initial synthesis of the integrated circuit layout representation of FIG. 2A, in accordance with embodiments of the present disclosure.

FIG. 2B illustrates an example identification of a plurality of violations associated with synthesizing the integrated circuit layout representation of FIG. 2A, in accordance with embodiments of the present disclosure. In FIG. 2B, paths of the integrated circuit layout representation of FIG. 2A that succeeded in meeting timing constraints are represented in the graph according to their location in the integrated circuit layout representation (e.g., the X axis and Y axis of FIG. 2B) and their location in a hierarchy of the layout representation (e.g., the hierarchy or Z axis of FIG. 2B). In FIG. 2B, paths represented by squares are associated with least success in meeting timing constraints (e.g., associated with smaller numbers of the X, Y, and Z axes in relation to the circles and triangles), those represented by circles are associated with the greatest success in meeting timing constraints (e.g., associated with higher numbers of the X, Y, and Z axes in relation to the triangles and squares). Paths represented by triangles are associated with levels of success between the least and greatest success (e.g., associated with numbers on the X, Y, and Z axes that are between those of the squares and circles).

Figure 2C:
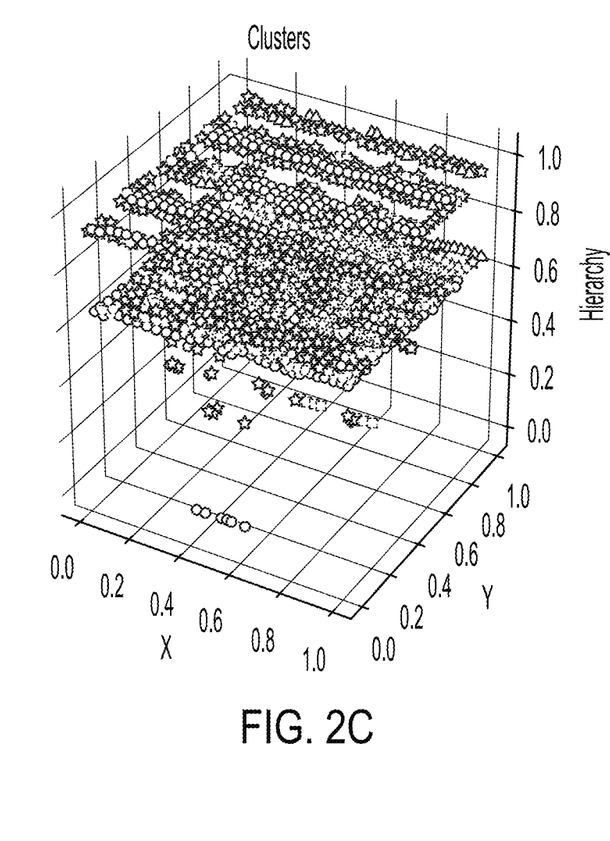
FIG. 2C illustrates an example identification of clusters associated with the initial synthesis of the integrated circuit layout representation of FIG. 2A, in accordance with embodiments of the present disclosure.

FIG. 2C illustrates an example identification of a plurality of clusters associated with running the integrated circuit layout representation of FIG. 2A through an integrated circuit synthesis tool, in accordance with embodiments of the present disclosure. In FIG. 2C, clusters of those identified paths of FIG. 2B are identified based on one or more affinities shared by the paths, for example group, hierarchy, name, constraint, violation, or location. Shown in FIG. 2C, a group of paths along 0.4 of the Y axis and between 0.2 and 0.6 of the X axis are identified as part of a cluster (e.g., represented by circles). Additional paths within the graph of FIG. 2C are associated with the same cluster, also represented by circles in FIG. 2C. By way of further example, paths represented by stars in FIG. 2C may be considered part of the same cluster, as may be paths represented by triangles. Identification of the clusters is performed using unsupervised machine learning, as discussed herein.

Figure 2D:
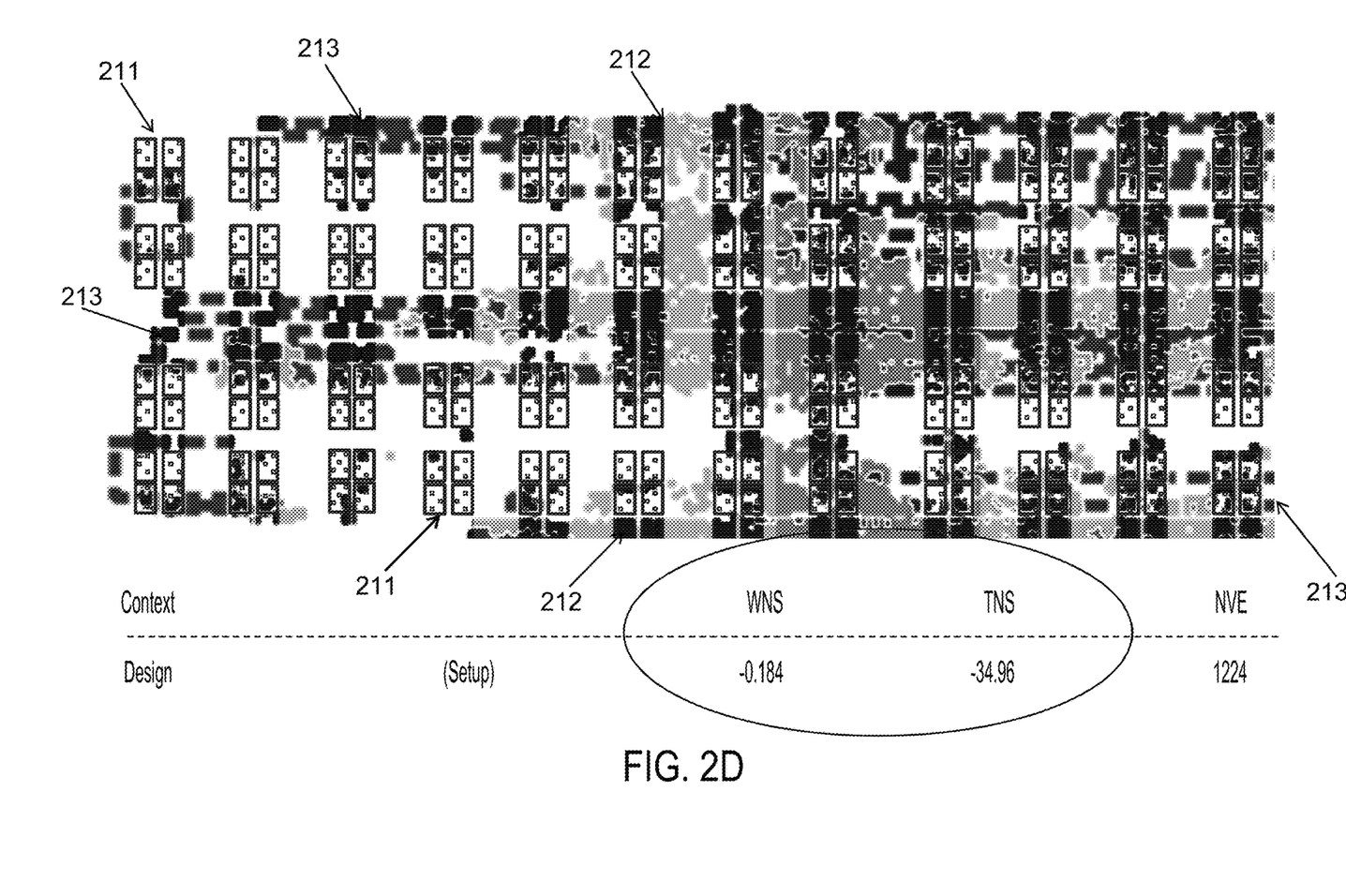
FIG. 2D illustrates an example of applying placement bounds to the integrated circuit layout representation of FIG. 2A during a subsequent synthesis of the integrated circuit layout representation along with information related to the clusters, in accordance with embodiments of the present disclosure.

FIG. 2D illustrates an example of applying placement bounds to the integrated circuit layout representation of FIG. 2A during a subsequent synthesizing of the integrated circuit layout representation, in accordance with embodiments of the present disclosure. That is, during a subsequent synthesizing of the integrated circuit representation, the identification of clusters of endpoints or paths (e.g., as identified in FIG. 2C) enables similar treatment of the endpoints or paths of a cluster. For example, endpoints may be grouped according to an amount of slack required for each endpoint as well as a respective location of each endpoint. In FIG. 2D, the squares (e.g., 211) represent memory instantiations while the shaded dots (e.g., 212) represent standard cell components. The darkest shaded rectangles (e.g., 213) represent placement bounds generated according to embodiments herein.

Awareness that a plurality of endpoints should be treated similarly during the synthesis enables optimal grouping of the endpoints for partitioning purposes, and results in significant performance improvements.

Shown in FIG. 2D, the example integrated circuit (IC) design (e.g., an application of a bitcoin mining engine) of FIG. 2A is synthesized again along with the bounds identified with respect to FIG. 2C, which results in an $F_{MAX}$ of 1.46 gigahertz (GHz) (e.g., a significant improvement as compared to FIG. 2A). Also shown in FIG. 2C, the results of synthesizing the design along with the bounds are a worst negative slack (WNS) of −0.184 (e.g., an improvement over FIG. 2A), a total negative slack (TNS) of −34.96 (e.g., an improvement over FIG. 2A), and an NVE of 1224. FIG. 2D illustrates 256 medium effort bounds with 182039 points.

Figure 3:
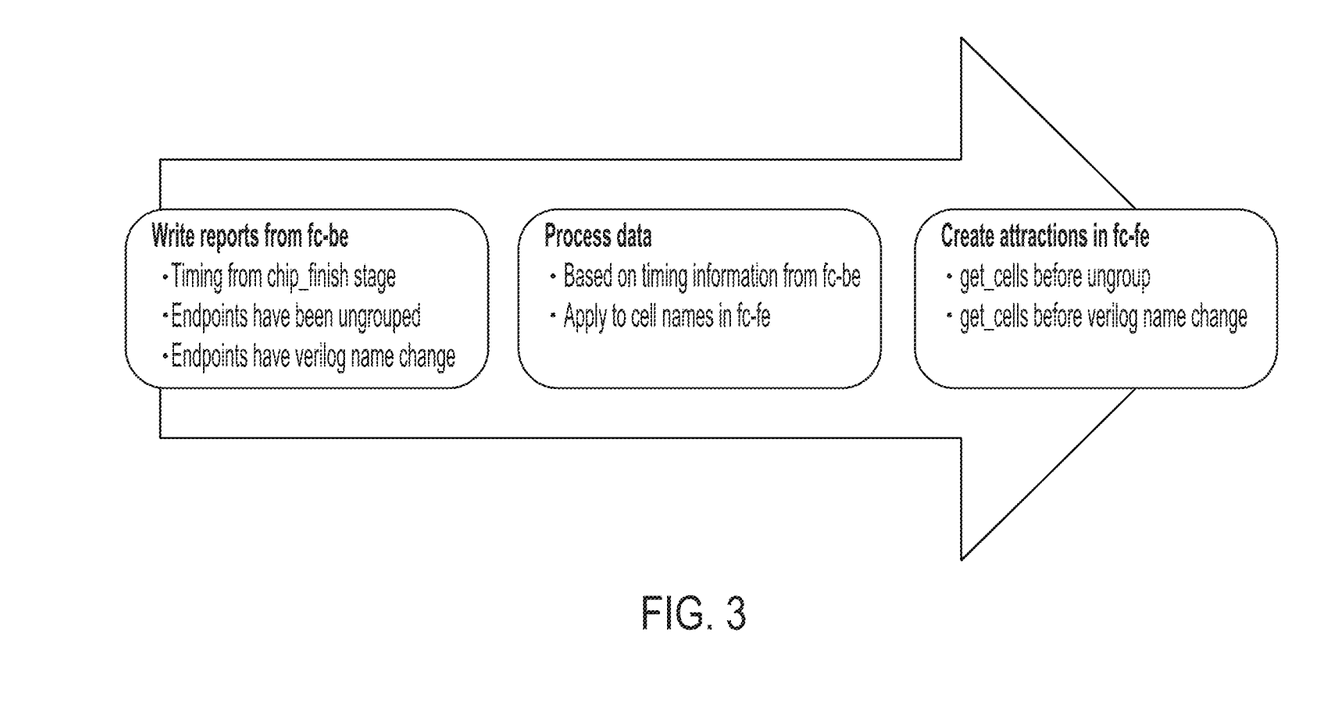
FIG. 3 illustrates a flowchart of various processes for use with embodiments of the present disclosure.

FIG. 3 illustrates a flowchart of various processes for use with embodiments of the present disclosure. FIG. 3 illustrates feedback that can be provided from a backend to a frontend in an IC design process. In FIG. 3, feedback or information including timing reports, ungrouped endpoints, or endpoints with changed names may be provided so that timing information and name change information may be passed along for the creation of placement bounds according to embodiments described herein.

Figure 4:
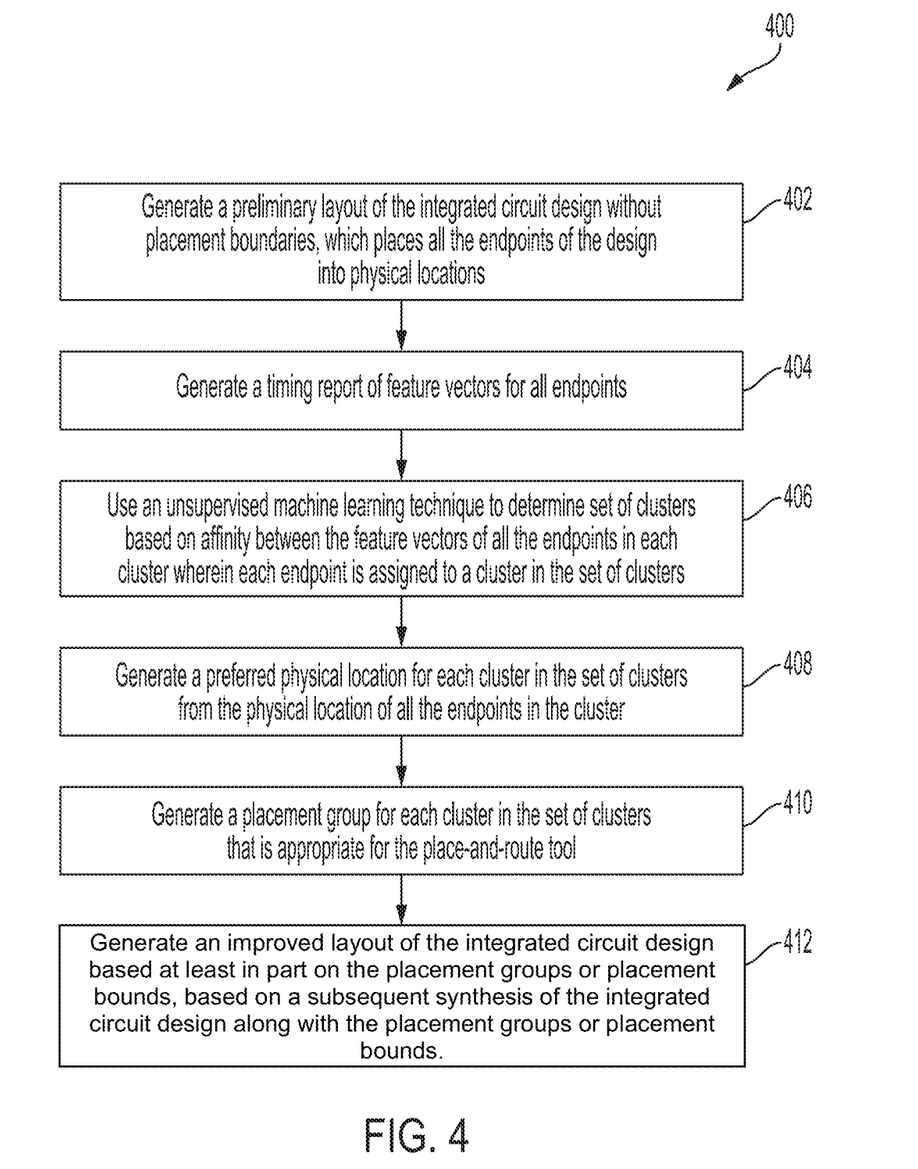
FIG. 4 illustrates a flowchart of various processes for use with embodiments of the present disclosure.

FIG. 4 illustrates a flowchart of various processes for use with embodiments of the present disclosure. In FIG. 4, an example method 400 includes generating, at 402 and by processing circuitry, a preliminary layout of an integrated circuit design without placement bounds or boundaries. In embodiments, the generating 402 includes placing all of the endpoints of the IC design into physical locations.

The example method 400 continues at 404 by generating, using processing circuity, a timing report including feature vectors for all of the endpoints of the IC design.

The example method 400 continues at 406 by using or applying, using processing circuitry, unsupervised machine learning to determine sets of clusters based on affinity between the feature vectors of the endpoints in each cluster. In embodiments, each endpoint is assigned to a cluster of the set of clusters.

The example method 400 continues at 408 by generating, using processing circuitry, a preferred physical location for each cluster in the set of clusters based at least in part on the physical locations of all of the endpoints in the cluster.

The example method 400 continues at 410 by generating, using processing circuitry, a placement group for each cluster in the set of clusters that is appropriate for a place and route tool. For example, different tools are associated with different commands (e.g., a TCL command for a given tool may differ from a TCL command for a different tool; appropriate in this context means that a command is recognizable by the tool performing the placement). In embodiments, the placement groups comprise placement bounds as described herein.

The example method 400 continues at 412 by generating, using processing circuitry, an improved layout of the integrated circuit design based at least in part on the placement groups or placement bounds. The improved layout is generated based on a subsequent synthesis of the integrated circuit design along with the placement groups or bounds.

Figure 5:
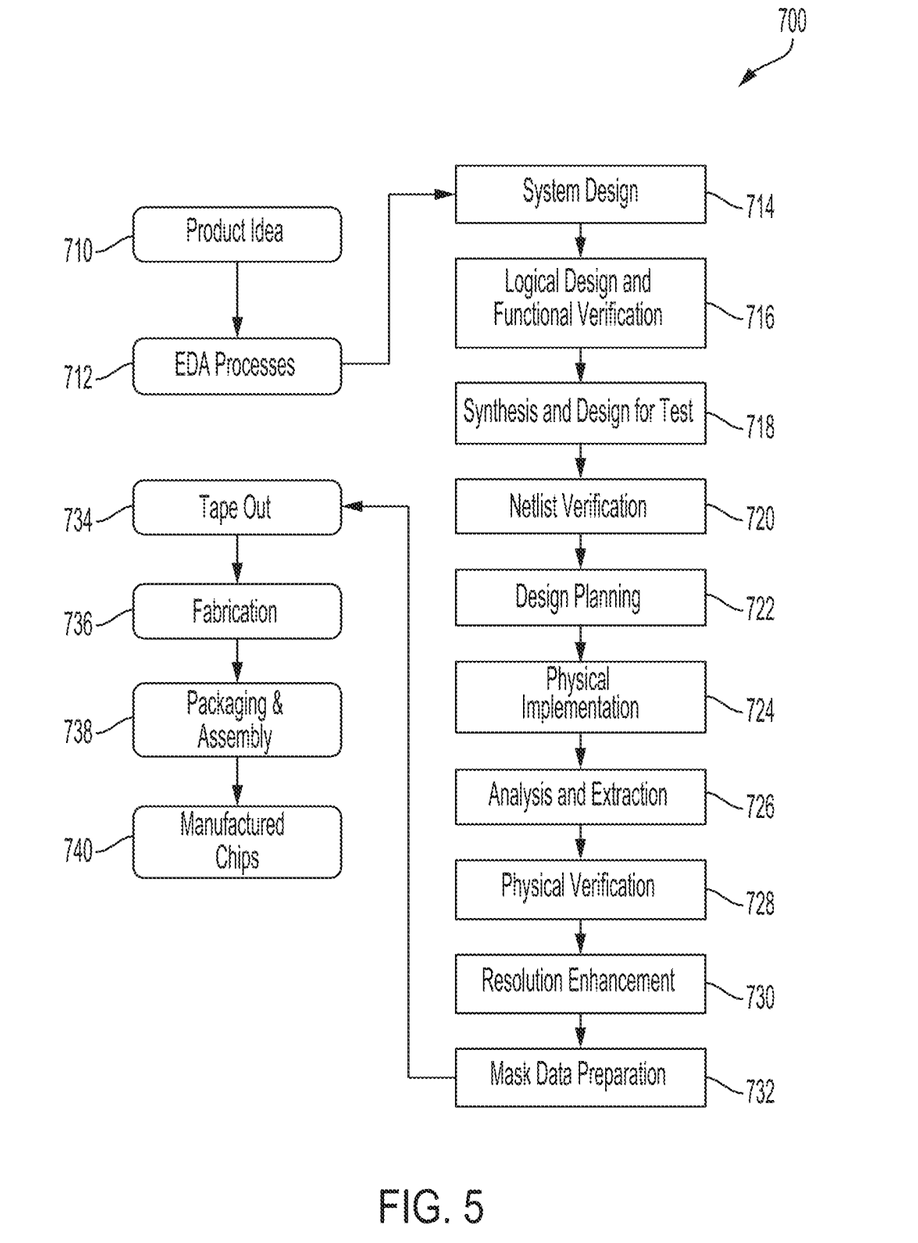
FIG. 5 depicts a flowchart of various processes used during the design and manufacture of an integrated circuit in accordance with some embodiments of the present disclosure.

FIG. 5 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 6) may be used to store the programs and data structures that are used by some or all of the EDA products described herein, and products used for development of cells for the library and for physical and logical design that use the library.

Figure 6:
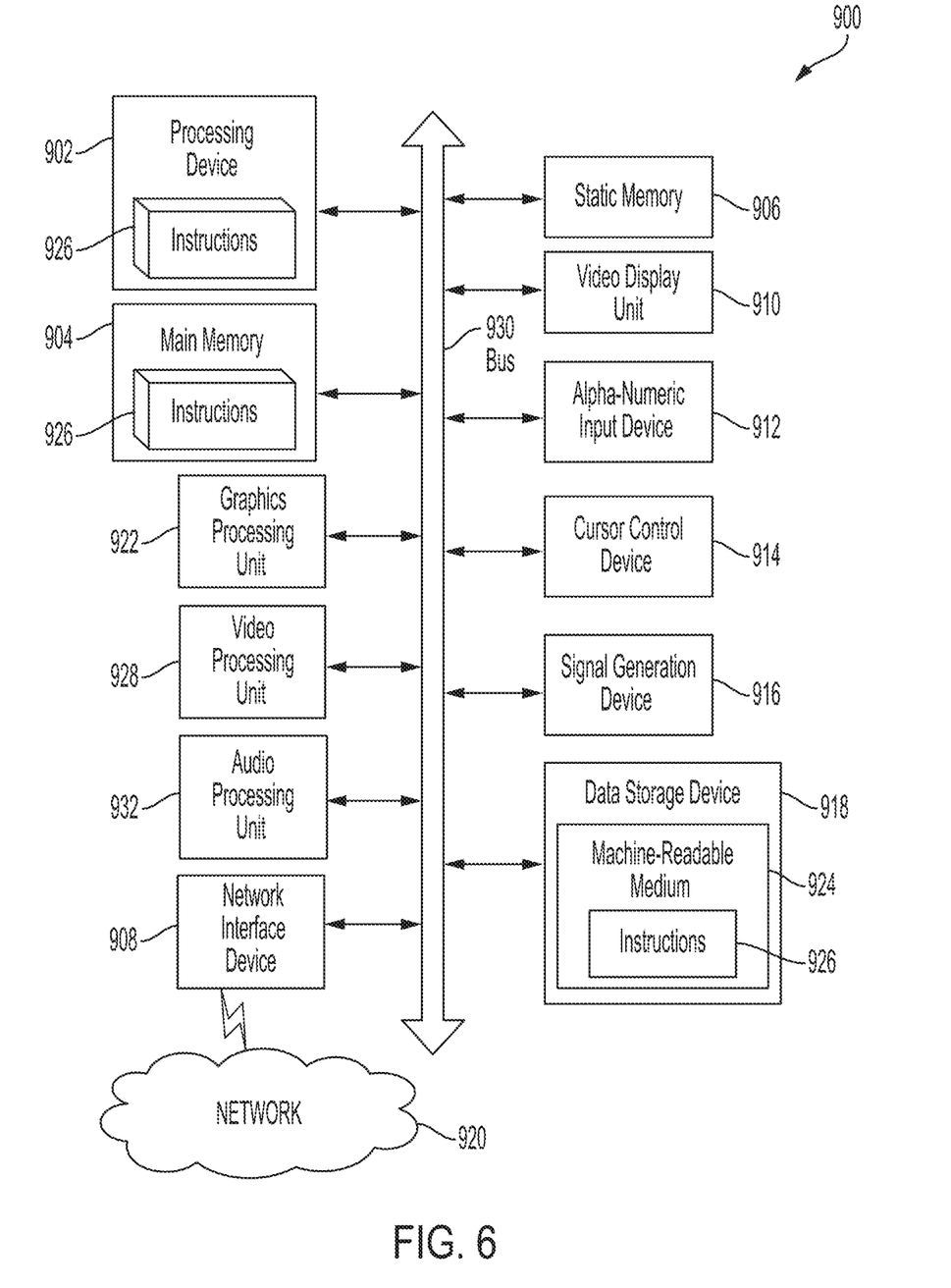
FIG. 6 depicts an example diagram of an example computer system in which embodiments of the present disclosure may operate.

FIG. 6 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   identifying, based on a first synthesizing of an integrated circuit layout representation, a plurality of integrated circuit layout endpoints;
   identifying, based on a plurality of layout feature vectors each representing a layout endpoint of the plurality of integrated circuit layout endpoints, a plurality of integrated circuit layout clusters, each integrated circuit layout cluster comprising a unique subset of integrated circuit layout endpoints of the plurality of integrated circuit layout endpoints; and
   applying, using a processor and based on a subsequent synthesizing of the integrated circuit layout representation, placement bounds to the integrated circuit layout representation, wherein the placement bounds are applied based on the plurality of integrated circuit layout clusters.

2. The method of claim 1, wherein identifying the plurality of integrated circuit layout clusters comprises applying unsupervised machine learning to the plurality of layout feature vectors.

3. The method of claim 2, wherein the unsupervised machine learning comprises density-based clustering.

4. The method of claim 3, wherein the density-based clustering comprises identifying subsets of integrated circuit layout endpoints of the plurality of integrated circuit layout endpoints based on affinities associated with data records of layout feature vectors associated with the integrated circuit layout endpoints.

5. The method of claim 1, wherein a layout feature vector comprises a plurality of data records, wherein each data record comprises a data value representative of one or more of group designation, hierarchical endpoint name, required path time, slack, endpoint location launch clock, start point hierarchical name, or start point physical location.

6. The method of claim 1, further comprising:
   identifying an integrated circuit layout cluster subset comprising those integrated circuit layout clusters of the plurality of integrated circuit layout clusters that meet one or more constraints; and
   applying the placement bounds to the integrated circuit layout cluster subset.

7. The method of claim 6, wherein the one or more constraints comprise timing constraints.

8. The method of claim 1, wherein a placement bound defines constraints associated with placement of one or more cells within an integrated circuit design represented by the integrated circuit layout representation.

9. The method of claim 8, wherein a placement bound comprises one or more of a command, a bound name, a boundary region, an effort definition, or a list of cells within an integrated circuit layout cluster of the plurality of integrated circuit layout clusters.

10. A non-transitory computer storage medium for storing instructions that, when executed by an apparatus, cause the apparatus to:
    identify, based on a first synthesizing of an integrated circuit layout representation, a plurality of integrated circuit layout endpoints;
    identify, based on a plurality of layout feature vectors each representing a layout endpoint of the plurality of integrated circuit layout endpoints, a plurality of integrated circuit layout clusters, each integrated circuit layout cluster comprising a unique subset of integrated circuit layout endpoints of the plurality of integrated circuit layout endpoints; and apply, based on a subsequent synthesizing of the integrated circuit layout representation, placement bounds to the integrated circuit layout representation, wherein the placement bounds are applied based on the plurality of integrated circuit clusters.

11. The non-transitory computer storage medium of claim 10, wherein identifying the plurality of integrated circuit layout clusters comprises applying unsupervised machine learning to the plurality of layout feature vectors.

12. The non-transitory computer storage medium of claim 11, wherein the unsupervised machine learning comprises density-based clustering.

13. The non-transitory computer storage medium of claim 12, wherein the density-based clustering comprises identifying subsets of integrated circuit layout endpoints of the plurality of integrated circuit layout endpoints based on affinities associated with data records of layout feature vectors associated with the integrated circuit layout endpoints.

14. The non-transitory computer storage medium of claim 11, wherein a layout feature vector comprises a plurality of data records, wherein each data record comprises a data value representative of one or more of group designation, hierarchical endpoint name, required path time, slack, endpoint location launch clock, start point hierarchical name, or start point physical location.

15. The non-transitory computer storage medium of claim 11, wherein the at least one non-transitory computer storage medium stores instructions that, when executed by an apparatus, further cause the apparatus to:
identify an integrated circuit layout cluster subset comprising those integrated circuit layout clusters of the plurality of integrated circuit layout clusters that meet one or more constraints; and
apply the placement bounds to the integrated circuit layout cluster subset.

16. The non-transitory computer storage medium of claim 15, wherein the one or more constraints comprise timing constraints.

17. The non-transitory computer storage medium of claim 11, wherein a placement bound defines constraints associated with placement of one or more cells within an integrated circuit design represented by the integrated circuit layout representation.

18. The non-transitory computer storage medium of claim 17, wherein a placement bound comprises one or more of a command, a bound name, a boundary region, an effort definition, or a list of cells within an integrated circuit layout cluster of the plurality of layout integrated circuit clusters.

19. An apparatus comprising at least one processor and at least one memory storing instructions that, when executed by the processor, cause the apparatus to:
identify, based on a first synthesizing of an integrated circuit layout representation, a plurality of integrated circuit layout' endpoints;
identify, based on a plurality of layout feature vectors each representing a layout endpoint of the plurality of integrated circuit layout endpoints, a plurality of integrated circuit layout clusters, each integrated circuit layout cluster comprising a unique subset of integrated circuit layout endpoints of the plurality of integrated circuit layout endpoints; and
apply, based on a subsequent synthesizing of the integrated circuit layout representation, placement bounds to the integrated circuit layout representation, wherein the placement bounds are applied based on the plurality of integrated circuit layout clusters.

* * * * *